J. H. HAERRY.
FILTER AND PROCESS OF FILTERING.
APPLICATION FILED JAN. 10, 1920.

1,384,754.

Patented July 19, 1921.

Inventor
John H. Haerry
By Erwin Wheeler & Woolard
Attorneys.

UNITED STATES PATENT OFFICE.

JOHN H. HAERRY, OF MILWAUKEE, WISCONSIN.

FILTER AND PROCESS OF FILTERING.

1,384,754. Specification of Letters Patent. Patented July 19, 1921.

Application filed January 10, 1920. Serial No. 350,571.

*To all whom it may concern:*

Be it known that I, JOHN H. HAERRY, a citizen of the United States, residing at Milwaukee, county of Milwaukee, and State of Wisconsin, have invented new and useful Improvements in Filters and Processes of Filtering, of which the following is a specification.

This invention relates to filters and to the process of filtering.

One of the objects of this invention is to provide a filter in which oxygen may readily be diffused throughout the filtering material without the necessity of employing elaborate or complicated structures for securing this result.

A further object is to provide a filter having the filtering material arranged in vertical walls with the upper portion of the walls exposed to the air and with the water traveling substantially horizontally through these vertical walls.

A further object is to provide a filter which is capable of being made in sizes for handling large quantities of water and which also handles a large quantity of water in proportion to its size.

A further object is to provide a method of filtering which simplifies the construction of filters by employing a horizontal flow of water and a vertical flow of air.

In the drawings—

Figure 1:
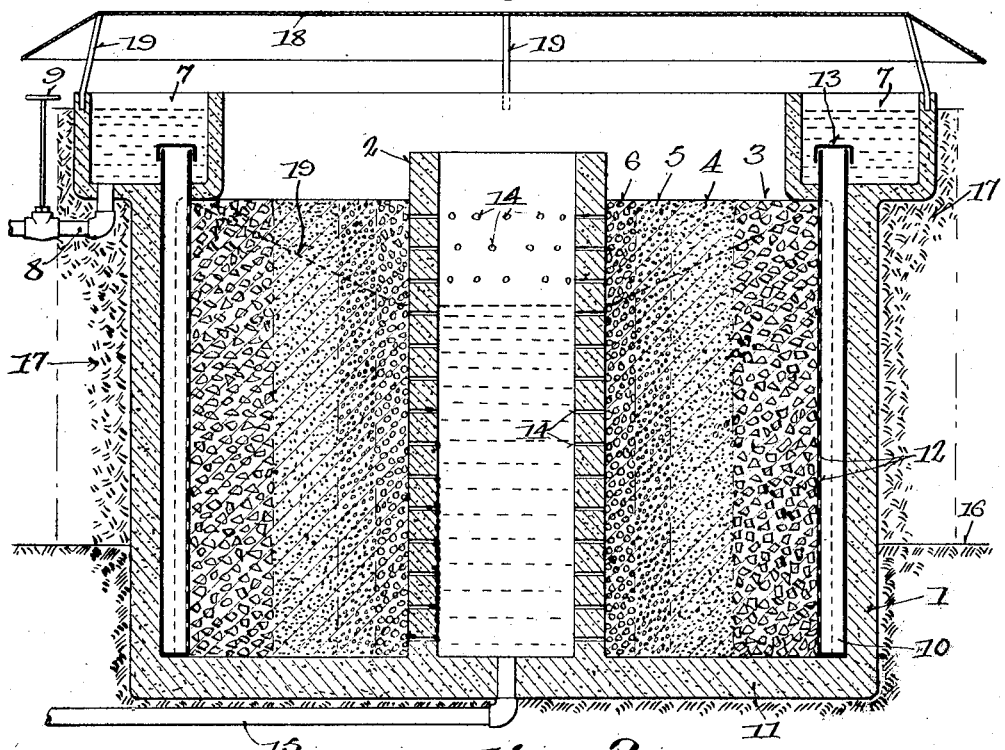
Figure 1 is a vertical sectional view of the filter.
Figure 2:
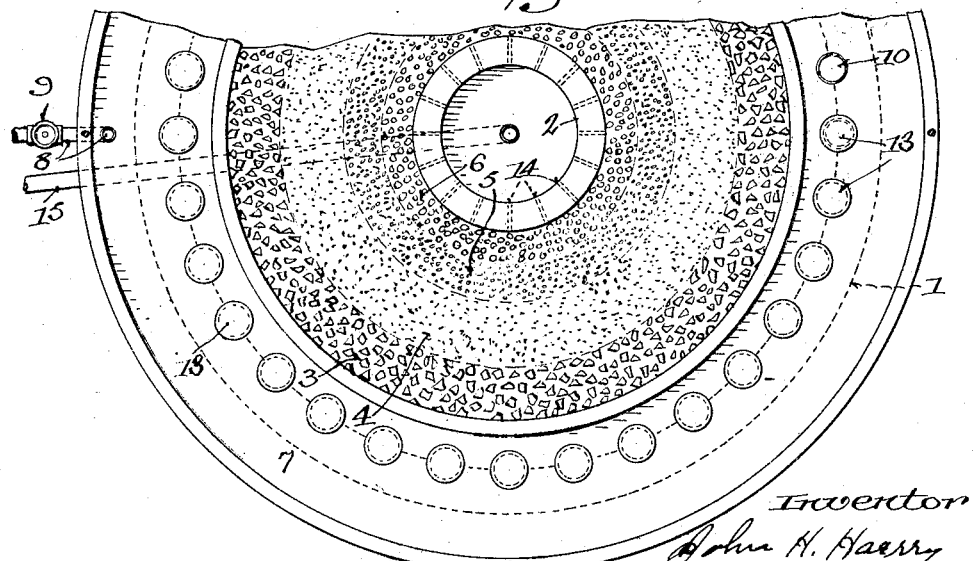
Fig. 2 is a partial plan view of the filter.

The filter comprises a circular outer retaining wall 1 and a circular inner wall 2. Between these walls successive concentric vertical walls of filtering material are positioned. The outer annular filtering wall 3 consists of coke, the next wall 4 of fine sand, the third wall 5 of coarser sand, and the inner wall 6 of fine gravel. The walls 3 and 4, which are of coke and fine sand, respectively, are thicker than the walls 5 and 6. The sand not only performs its function of filtering but also serves to retard, or hold the water in the chemically active coke layer for a longer time than if the sand were absent. On account of the ring formation and the positioning of the coke layer at the outside, such coke layer presents the largest cross-sectional area of the several layers.

An annular supply trough 7, fed by any suitable means, (not shown) furnishes water to the filter. A drain pipe 8, controlled by a valve 9, is provided for cleaning the trough 7. From this annular supply trough, vertical pipes 10 extend downwardly to the bottom part of the structure and may rest upon the bottom. These pipes may be of earthenware and are perforated on the side next to the filtering rings at 12. These pipes may also be filled with pieces of unglazed earthenware, which absorb very easily dissolved and undissolved organic and inorganic substances. The water therefore, passes from the supply trough under zinc caps 13 and downwardly through the pipes 10 into the filter. From the pipes the water passes radially inwardly through the successive layers of filtering material and finally arrives at the central annular wall 2 which is provided with a series of perforations 14 through which the water freely passes. This annular central member forms a small temporary reservoir for the filtered water which may be led therefrom through a delivery pipe 15 from the bottom of said chamber.

All of the walls and the bottom of the filter are formed of reinforced concrete and are set down a slight distance below the ground level 16. Around the upper portion of the filter a packing of ashes 17 is provided to form a heat insulating portion extending a considerable distance outwardly so as to protect the filter from freezing. A shed 18 may be provided above the filter which may be supported upon rods 19 set within the outer portion of the annular supply trough 7.

In the operation of this filter, the water passes downwardly through the tubes 10 and substantially horizontally through the filtering ring the gradient being indicated by the dotted line 19. The upper ends of these filtering layers are exposed to the air and a considerable quantity of oxygen is absorbed by these layers of filtering material, particularly the coke layer 3. Chemical reactions take place in the coke layer, and useful bacteria may live in such layer as it supplies the necessary air, but under the same conditions the harmful bacteria are destroyed. Coke has the ability of absorbing large quantities of gases and harmful gases are oxidized and rendered harmless by the bacteria. Disagreeable tastes and odors are removed in the coke layer. These actions can not take place in the usual filters for the reason that the horizontal layers of filtering material are completely covered by the water and access of oxygen is prevented. If the water is a hard water, containing soluble magnesium and calcium salts, these salts are converted in the coke layer into insoluble silicates, provided the water contains free silicic acid. In case the water does not contain silicic acid, this deficiency may be readily overcome by the addition of waterglass to the water in the trough 7. Iron salts are oxidized to insoluble iron hydroxids. In case the water is objectionably acid, as for instance, water drawn from forest or marsh ground containing numerous loam acids, limestone is placed within the tubes 10 to neutralize the acid. In cases where hard water is required, the water can be hardened by putting gypsum into the supply trough 7.

This filter is admirably adapted to the handling of large quantities of water as it may readily be made in large sizes by making the annular rings of a larger diameter following the same plan outlined above, or by forming an outer annular reservoir, for the filtered water, on the outer side of outer concrete wall and building successive filtering rings around such wall. As many of these additional concentric filtering units may be used as are needed, each unit being complete in itself.

The process of filtering employed in this filter consists essentially in passing the water substantially horizontally through the layers of filtering material while allowing such layers to project upwardly into the air above the water within such layers. By this arrangement, a quantity of oxygen is taken up by the filtering material such oxygen entering through the upper exposed portions thereof as well as through some of the openings 14 in the central reservoir 2. By employing this process it is possible to use a gravity filter without an extensive system of pipes or other devices for bringing the oxygen to the filtering material.

Experiments have shown that this kind of a filter filters 50% more water, in the same time, than a corresponding sand filter, and that the filtered water is of a better quality. Experiments have also shown that an ordinary sand filter has to be cleaned every month, while this filter need be cleaned only every twelve months.

I claim:

1. A filter comprising a plurality of vertical filtering walls, means for passing the water substantially horizontally therethrough, said filtering walls being exposed to the air at one end.

2. A filter comprising annular filtering walls, means for passing water substantially horizontally therethrough, and means for permitting oxygen to pass downwardly into the water through said filtering walls.

3. A filter comprising annular inner and outer vertical retaining walls, a series of concentric vertical filtering walls, positioned between said first mentioned walls, an annular supply trough adjacent one of said walls, and means for causing water to pass through the action of gravity substantially radially through said filtering walls.

4. A filter comprising annular inner and outer vertical retaining walls, a series of concentric vertical filtering walls, positioned between said first mentioned walls, and means for causing water to pass substantially radially through said filtering walls, the upper portion of said annular filtering walls being above the water level within said walls and freely exposed to the outer air.

5. A filter comprising annular inner and outer concentric vertical retaining walls, an annular trough arranged around the upper portion of the outer retaining wall, a series of vertical walls composed of filtering material concentrically arranged, said filtering walls being positioned between said retaining walls and means for conducting the water under the action of gravity at a plurality of points from said supply trough to the outer portion of the outer annular filtering ring.

6. The process of filtering water, which process consists of passing the water in a substantially horizontal direction through filtering and oxygen absorbing material, and allowing oxygen to pass into said material, the line of flow of the oxygen being substantially at right angles to that of the water.

7. The process of filtering water which process consists of passing water horizontally and substantially radially through filtering and oxygen absorbing material in such a manner that a material time is allowed for the passage through the oxygen absorbing material, and allowing oxygen to flow along substantially vertical paths into the water by means of the oxygen absorbing material.

8. The process of filtering water, which process consists of passing water horizontally and substantially radially through coke in such a manner that a material time is allowed for the passage through the coke, and allowing oxygen to pass along substantially vertical paths into the water by means of the coke.

In testimony whereof I affix my signature in the presence of two witnesses.

JOHN H. HAERRY.

Witnesses:
 WALTER A. KUEBLER,
 A. R. WOOLFOLK, Jr.